United States Patent
Lewis et al.

(10) Patent No.: US 9,163,124 B2
(45) Date of Patent: Oct. 20, 2015

(54) SYSTEM AND METHODS FOR SLURRY HYDROCONVERSION PITCH DISPOSITION AS SOLID PELLETS AND COMPOSITION OF THE SAME

(71) Applicants: William Ernest Lewis, Baton Rouge, LA (US); Randolph John Smiley, Hellertown, PA (US); Patrick Loring Hanks, Bridgewater, NJ (US)

(72) Inventors: William Ernest Lewis, Baton Rouge, LA (US); Randolph John Smiley, Hellertown, PA (US); Patrick Loring Hanks, Bridgewater, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 14/308,948

(22) Filed: Jun. 19, 2014

(65) Prior Publication Data
US 2015/0011686 A1  Jan. 8, 2015

Related U.S. Application Data

(60) Provisional application No. 61/866,138, filed on Aug. 15, 2013, provisional application No. 61/837,330, filed on Jun. 20, 2013.

(51) Int. Cl.

| | |
|---|---|
| C08L 95/00 | (2006.01) |
| C08J 3/20 | (2006.01) |
| C10G 45/16 | (2006.01) |
| C10G 47/26 | (2006.01) |
| C10G 49/12 | (2006.01) |
| C10L 5/04 | (2006.01) |
| C10L 5/16 | (2006.01) |
| C10L 5/22 | (2006.01) |
| C10L 5/36 | (2006.01) |
| C10L 5/14 | (2006.01) |

(52) U.S. Cl.
CPC .............. *C08J 3/203* (2013.01); *C08L 95/00* (2013.01); *C10G 45/16* (2013.01); *C10G 47/26* (2013.01); *C10G 49/12* (2013.01); *C10L 5/04* (2013.01); *C10L 5/146* (2013.01); *C10L 5/16* (2013.01); *C10L 5/22* (2013.01); *C10L 5/363* (2013.01); *C08J 2395/00* (2013.01); *C08J 2423/06* (2013.01); *C10L 2230/14* (2013.01); *C10L 2250/04* (2013.01); *C10L 2290/145* (2013.01); *C10L 2290/24* (2013.01); *C10L 2290/30* (2013.01)

(58) Field of Classification Search
CPC .... C08J 3/203; C08J 2395/00; C08J 2423/06; C08L 95/00
USPC .......................................................... 524/66
See application file for complete search history.

(56) References Cited

U.S. PATENT DOCUMENTS

| | | |
|---|---|---|
| 4,931,231 A | 6/1990 | Teppo |
| 5,755,955 A | 5/1998 | Benham et al. |
| 6,331,245 B1 | 12/2001 | Moretta et al. |
| 6,361,682 B1 | 3/2002 | Moretta et al. |
| 8,202,480 B2 | 6/2012 | McGehee et al. |
| 8,231,775 B2 | 7/2012 | McGehee et al. |
| 2010/0122939 A1 | 5/2010 | Bauer et al. |
| 2010/0329935 A1* | 12/2010 | McGehee et al. ............. 422/140 |
| 2011/0210045 A1 | 9/2011 | Kou et al. |
| 2013/0032993 A1 | 2/2013 | Izumiya et al. |
| 2013/0075303 A1 | 3/2013 | Heraud et al. |
| 2013/0112593 A1 | 5/2013 | Montanari et al. |
| 2013/0172452 A1* | 7/2013 | Corcoran et al. ............... 524/68 |

FOREIGN PATENT DOCUMENTS

| | | |
|---|---|---|
| GB | 768013 A | 2/1957 |

OTHER PUBLICATIONS

PCT Application No. PCT/US2014/043133, Communication from the International Searching Authority, Form PCT/ISA/210, dated Sep. 29, 2014, 10 pages.

* cited by examiner

*Primary Examiner* — Hui Chin
(74) *Attorney, Agent, or Firm* — Chad A. Guice

(57) ABSTRACT

A system and method for producing solid pellets from a slurry HDC pitch is disclosed which utilizes a polymer additive that is mixed with the pitch to increase the softening point of the solid pellets.

20 Claims, 1 Drawing Sheet

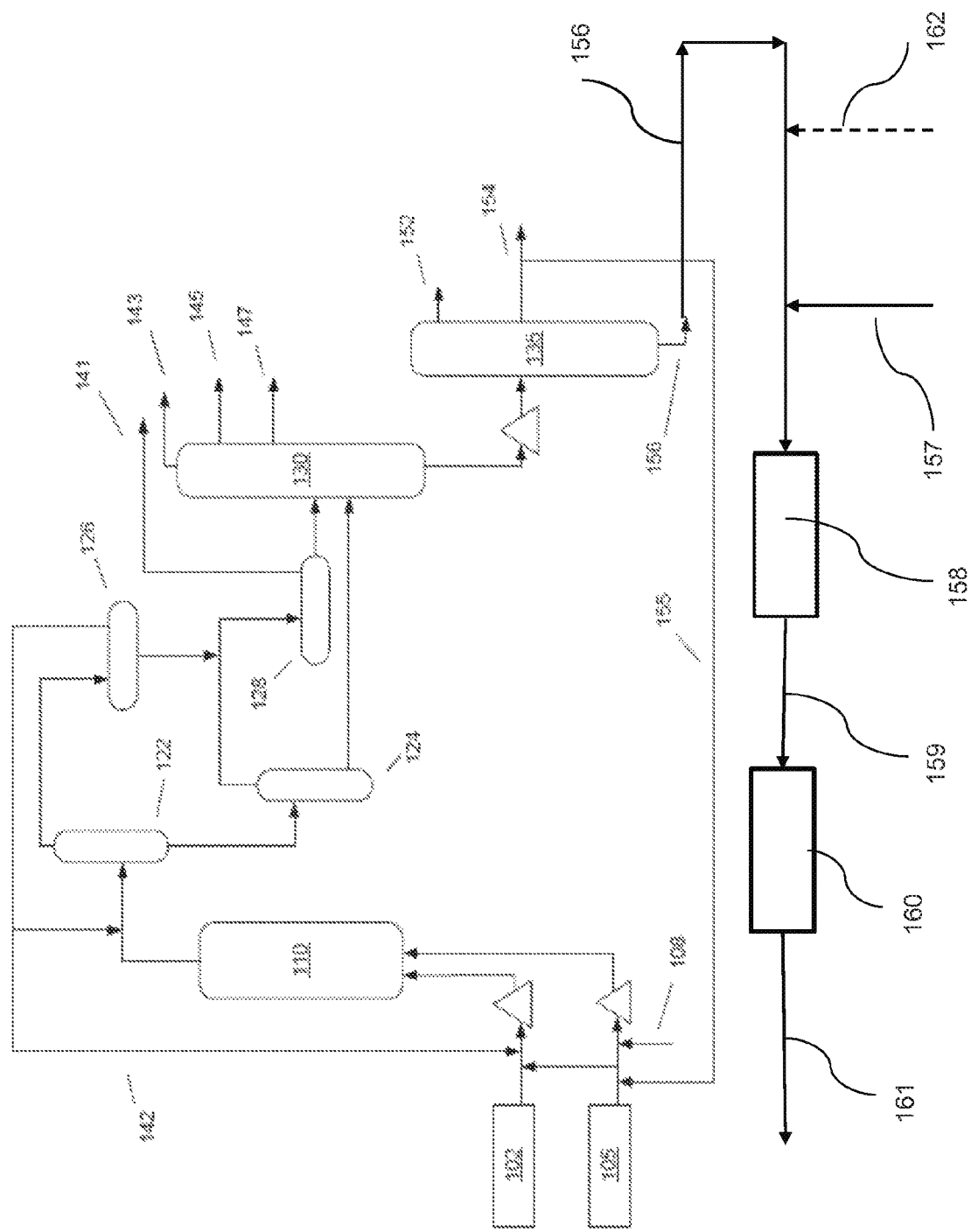

SYSTEM AND METHODS FOR SLURRY HYDROCONVERSION PITCH DISPOSITION AS SOLID PELLETS AND COMPOSITION OF THE SAME

CROSS-REFERENCE TO RELATED APPLICATIONS

This application claims the benefit of priority from U.S. Provisional Application 61/866,138, filed on Aug. 15, 2013, titled "System and Methods for Slurry Hydroconversion Pitch Disposition as Solid Pellets and Composition of the Same", the entirety of which is incorporated herein by reference. This application also claims the benefit of priority from U.S. Provisional Application 61/837,330, filed on Jun. 20, 2013, titled "Slurry Hydroconversion and Coking of Heavy Oils", the entirety of which is incorporated herein by reference.

FIELD OF THE INVENTION

The presently disclosed subject matter provides a system and methods for the processing of slurry hydroconversion ("HDC") pitch fraction or pitch for disposition as solid pellets. In particular, the presently disclosed subject matter provides a system and methods for the processing of slurry HDC pitch for disposition as solid pellets using a small amount of a polymer additive to increase the softening point of the slurry HDC pitch.

BACKGROUND OF THE INVENTION

Slurry HDC provides a method for the conversion of high boiling, low value petroleum fractions into higher value liquid products. Slurry HDC technology can process difficult feeds, such as feeds with high Conradson carbon residue (CCR), while still maintaining high liquid yields. In addition to resid feeds, slurry HDC units have been used to process other challenging streams present in refinery/petrochemical complexes such as deasphalted rock, steam cracked tar, and visbreaker tar.

Slurry HDC can be performed by processing a feed in one or more slurry HDC reactors. The reaction conditions in a slurry HDC reactor can vary based on the nature of the catalyst, the nature of the feed, the desired products, and/or the desired amount of conversion. The processing conditions in a slurry HDC reactor can be selected to achieve a desired level of conversion of a heavy oil feedstock, such as at least about 80% conversion of the feedstock to products boiling below 975° F. (or another conversion temperature), or at least about 85% conversion, or at least about 90% conversion, or at least about 95% conversion, or at least about 97.5% conversion. The remaining unconverted portion of the feed from slurry HDC represents an unconverted bottoms or "pitch" product.

The pitch generated during slurry HDC is often a challenging product to handle within a refinery. The pitch from a slurry HDC reactor tends to have both a high metals content and a high CCR weight percentage.

Pitch disposition from slurry HDC technologies (e.g. VCC®, Uniflex®, and Microcat) is problematic. Pitch disposition in a liquid form has storage, shipping, and stability issues. The liquid pitch cannot be fluxed economically with a reasonable amount of flux such that it can be sold and/or used as fuel oil. Furthermore, the liquid pitch may contain solids preventing fluxing, which may prevent the liquid pitch from meeting the solids specifications for fuel oils. As such, both producer and purchaser of the pitch are likely to require dedicated facilities to handle the liquid pitch.

Commonly assigned co-pending U.S. Provisional Patent Application No. 61/837,330, filed on Jun. 20, 2013, entitled "Slurry Hydroconversion and Coking of Heavy Oils" discloses various options for disposing of slurry HDC pitch, the disclosure of which is hereby incorporated herein by its entirety. The slurry HDC pitch can be used as a filler material for another application (e.g., the pitch can potentially be used as additional material for asphalt production). Another option for handling the slurry HDC pitch is to attempt to coke the pitch from a slurry HDC. Using the pitch as a portion of a feed to a coker can pose a variety of challenges. An option for processing the pitch that avoids a possible intermediate upgrading step is to use the pitch as at least a portion of a feed to a partial oxidation (POX) process.

The pitch can be used as a fuel in a cement production plant and other production facilities. However, due to the high metals content, the pitch may require further processing in order to be suitable for use even in this application. Additionally, in order to send the material off-site may require the pitch to undergo an additional treatment to solidify or pelletize to make the molecules more transportable. The pelletized HDC pitch could be sold as a free flowing solid having a greater heating power than conventional petcoke or coal.

The pelletization of HDC pitch requires a certain softening point (as measured, for example, by ASTM D36 (Ring and Ball) or ASTM D3461 (Cup and Ball)) to prevent agglomeration when pellets are subjected to load stresses during transport to the end user. Achieving a desired or target softening point can be accomplished in part by having relatively deep cuts and a high initial boiling points of the pitch. However, in order to accomplish this for certain feedstocks, especially those used in connection slurry HDC processing, the reaction conditions in slurry HDC process may need to be altered, which may adversely impact the slate of products produced from the slurry HDC process. There is a need to adjust the softening point of pellets produced from slurry HDC pitch without altering the slurry HDC process or the product slate resulting therefrom.

SUMMARY OF THE INVENTION

In various aspects, methods are provided for producing solid pellets from a HDC pitch produced from a HDC process. The method includes providing a stream of HDC pitch. The HDC pitch is preferably a slurry HDC pitch produced from a slurry hydroconversion process. The method further includes providing a stream of polymer additive. The stream of polymer additive is preferably a molten stream of polymer additive. The polymer additive is preferably one of polyethylenes, polypropylenes and polycarbonates and mixtures thereof. The method further includes mixing the stream of HDC pitch with the stream of polymer additive to produce a mixture of HDC pitch and polymer additive. The mixture of HDC pitch and polymer additive contains less than 10 wt % of polymer additive, preferably contains less than 5 wt % of polymer additive and more preferably less than 1 wt % of polymer additive. The method further includes pelletizing the mixture of HDC pitch and polymer additive to produce pellets having a softening point of at least 65° C. (150° F.) and more preferably a softening point of at least 93° C. (200° F.). The method may optionally include providing a stream of air and passing the stream of HDC pitch through the stream of air prior to mixing with the stream of the polymer additive.

Additionally or alternatively, in some aspects a system is provided for producing solid pellets from a HDC pitch produced from a HDC process. The system includes a source of HDC pitch and a source of polymer additive. The HDC pitch is preferably a slurry HDC pitch produced from a slurry hydroconversion process. The source of polymer additive is a molten stream of polymer additive. The polymer additive is one of polyethylenes, polypropylenes and polycarbonates and mixtures thereof. The system further includes a mixing assembly for mixing the HDC pitch with the polymer additive to produce a mixture of HDC pitch and polymer additive. The mixture of HDC pitch and polymer additive contains less than 10 wt % of polymer additive, preferably less than 5 wt % of polymer additive and more preferably less than 1 wt % of polymer additive. The system also includes a pelletizing assembly for processing the mixture of HDC pitch and polymer additive to produce pellets having a softening point of at least 65° C. (150° F.) and more preferably a softening point of at least 93° C. (200° F.). The system may optionally include a source of air, wherein the HDC pitch is passed through the source of air prior to mixing with the polymer additive.

In still other aspects, a composition for a solid HDC pitch pellet is provided. The pitch pellet comprising a mixture of a HDC pitch and a polymer additive. The polymer additive is less than 10 wt % of the total mixture, more preferably less than 5 wt % of polymer additive and more preferably less than 1 wt % of polymer additive. The polymer additive is one of polyethylenes, polypropylenes and polycarbonates and mixtures thereof. The pellet having a softening point of at least 65° C. (150° F.) and preferably at least 93° C. (200° F.).

BRIEF DESCRIPTION OF THE FIGURES

FIG. 1 shows an example of a slurry HDC reaction system illustrating the processing of slurry HDC pitch in accordance with an aspect of the presently disclosed subject matter.

DETAILED DESCRIPTION OF THE EMBODIMENTS in various aspects, systems and methods are provided for slurry HDC of a heavy oil feed, such as an atmospheric resid or vacuum resid. FIG. 1 shows an example of a reaction system suitable for performing slurry HDC. The configuration in FIG. 1 is provided as an aid in understanding the general features of a slurry HDC process. It should be understood that, unless otherwise specified, that the presently disclosed subject matter relating to the slurry HDC pitch disposition as solid pellets described herein can generally be applied to any slurry HDC configuration or any other HDC configuration producing pitch.

With reference to FIG. 1, a heavy oil feedstock 105 is mixed with a catalyst 108 prior to entering one or more slurry hydroconversion reactors 110. The mixture of feedstock 105 and catalyst 108 can be heated prior to entering reactor 110 to achieve a desired temperature for the slurry hydroconversion reaction. A hydrogen stream 102 is also fed into reactor 110. Optionally, a portion of feedstock 105 can be mixed with hydrogen stream 102 prior to the hydrogen stream 102 entering reactor 110. Optionally, feedstock 105 can also include a portion of a recycled vacuum gas oil 155. Optionally, hydrogen stream 102 can also include a portion of recycled hydrogen 142.

The effluent from slurry HDC reactor(s) 110 is passed into one or more separation stages. For example, an initial separation stage can be a high pressure, high temperature (HPHT) separator 122. A higher boiling portion from the HPHT separator 122 can be passed to a low pressure, high temperature (LPHT) separator 124 while a lower boiling (gas) portion from the HPHT separator 122 can be passed to a high temperature, low pressure (HTLP) separator 126. The higher boiling portion from the LPHT separator 124 can be passed into a fractionator 130. The lower boiling portion from LPHT separator 124 can be combined with the higher boiling portion from HPLT separator 126 and passed into a low pressure, low temperature (LPLT) separator 128. The lower boiling portion from HPLT separator 126 can be used as a recycled hydrogen stream 142, optionally after removal of gas phase contaminants from the stream such as $H_2S$ or $NH_3$. The lower boiling portion from LPLT separator 128 can be used as a flash gas or fuel gas 141. The higher boiling portion from LPLT separator 128 is also passed into fractionator 130.

In some configurations, HPHT separator 122 can operate at a temperature similar to the outlet temperature of the slurry HDC reactor 110. This reduces the amount of energy required to operate the HPHT separator 122. However, this also means that both the lower boiling portion and the higher boiling portion from the HPHT separator 122 undergo the full range of distillation and further processing steps prior to any recycling of unconverted feed to reactor 110.

In an alternative configuration, the higher boiling portion from HPHT separator 122 used as a recycle stream 118 that is added back into feed 105 for processing in reactor 110. In this type of alternative configuration, the effluent from reactor 110 can be heated to reduce the amount of converted material that is recycled via recycle stream 118. This allows the conditions in HPHT separator 122 to be separated from the reaction conditions in reactor 110.

In FIG. 1, the fractionator 130 is shown as an atmospheric fractionator. The fractionator 130 can be used to form a plurality of product streams, such as a light ends or $C4^-$ stream 143, one or more naphtha streams 145, one or more diesel and/or distillate (including kerosene) fuel streams 147, and a bottoms fraction. The bottoms fraction can then be passed into vacuum fractionator 135 to form, for example, a light vacuum gas oil 152, a heavy vacuum gas oil 154, and a bottoms or pitch fraction 156. Optionally, other types and/or more types of vacuum gas oil fractions can be generated from vacuum fractionator 135. The heavy vacuum gas oil fraction 154 can be at least partially used to form a recycle stream 155 for combination with heavy oil feed 105.

The processing of the resulting slurry HDC pitch fraction or pitch 156 in accordance with the presently disclosed subject matter will now be described in greater detail. The pitch 156 is withdrawn from the vacuum fractionator 135 for further processing for conversion into solid pellets 161. The pitch 156 is combined with a polymer additive stream 157. The polymer additive stream 157 is preferably molten having a temperature of at least 155° C. The combined stream is then fed to a mixing assembly 158. In accordance with the presently disclosed subject matter, the mixing assembly 158 is preferably a static mixer or impeller. The presently disclosed subject matter, however, is not limited to the use of a mixer 158 for purposes of mixing the pitch 156 with the polymer additive stream 157; rather, other suitable devices that are capable of mixing these streams may be employed. For example, the pitch 156 and polymer additive stream 157 could be fed to a pump assembly. The suction force of the pump and the shear from the pump would provide sufficient mixing of the pitch and polymer additive stream.

The resulting hot mixed stream 159 is fed to a pelletizer 160 whereby the stream 159 undergoes a pelletization process to produce pellets 161. The mixed stream 159 preferably has a temperature in the range of approximately 200-260° C. (392-500° F.). Temperatures above and below the range are considered to be within the scope of the presently disclosed subject matter provided such temperatures permit the formation of pellets. The resulting pellets 161 have increased softening temperatures resulting enhanced transportation capabilities. It is contemplated that the pelletization process can be any known pelletization process that may be used to produce solid pellets from pitch. The process may include, but is not limited to, the use of extrusion, the use of a prilling head spray into a cooling medium or the formation of droplets placed on a cooling belt.

The use of the polymer additives will now be discussed in greater detail. Various polymer additives are considered to be well within the scope of the presently disclosed subject matter including but not limited to polyethylenes, polypropylenes and polycarbonates and mixtures thereof. The use of the polymer additives increases the softening temperature of the pelletized slurry HDC pitch to at least 65° C. (150° F.). This should be sufficient for transportation of the pellets in most climates. The softening temperature of the pelletized slurry HDC pitch is preferably in excess of 93° C. (200° F.) to ensure that the pellets will be free flowing during transport in all climates and for worldwide transport while subject to axial loads.

Low density polyethylene (LDPE) has a softening point around 85-100° C. (185-212° F.) and is effective in increasing the softening point of the pellets 161. High density polyethylene (HDPE) has a softening point around 112-132° C. (234-270° F.) and is effective in increasing the softening point of of the pellets 161. Polypropylene has a softening point around 95° C. (200° F.) and may also be effective in increasing the softening point of the pellets 161. Polycarbonate has a softening point around 147° C. (297° F.). Because of the higher softening point, the use of polycarbonate may present difficulties when blending with the pitch 156. As such, the selection of the polymer additive should not only be based upon its softening point, but also its ability to blend with the pitch 156 to formed a mixed stream 159.

A relatively small amount of the polymer additive is needed to increase the softening point of the pellets 161. The amount of polymer additive may vary based upon the polymer additive selected. Ideally, the polymer additive should be less than 10 wt % of the mixture 159, preferably the polymer additive should be less than 5 wt % of the mixture 159 and more preferably, the polymer additive should be less than 1 wt % of the mixture 159.

The molecular weight of the polymer additive can also be used to control the softening point of the pellets 161. The use of polymers having higher molecular weights typically corresponds to higher strength properties. Using higher molecular weight polymers having a molecular weight in excess of 100,000 and particularly over 1,000,000, will increase the softening point of the pellets.

The heating value of pitch resulting from slurry hydrocracking of, for example, Light Arab derived vacuum reside has a heating value of 14000 Btu/lb. The resulting solid pellets produced in accordance with the presently disclosed subject matter may exhibit an increased heating value with the addition of the polymer additive. For example, HDPE has a heating value of 19000 Btu/lb. The addition of HDPE to the pitch prior to pelletization will increase the heating value of the pellets compared to pellets formed from pitch alone. The slurry HDC pellets without the addition of a polymer additive and those with a polymer additive have a heating value greater than petcoke or coal, which makes the pellets a suitable alternative to both petcoke and coal. The polymer additive is particularly advantaged in that it does not contribute to the ash content of the pellets.

The softening point of the pellets 161 may be adjusted by first air blowing the pitch 156 with a stream of air 162 prior to the mixing with the polymer additive stream 157. The stream of air 162 is preferably supplied by an air blower or compressor. The use of air blowing is disclosed, for example, in U.S. Pat. No. 6,331,245 to Moretta et al., the disclosure of which is incorporated herein in its entirety by reference. The oxygen from the air stream 162 reacts with the naphthenic rings in the pitch and converts them to aromatic rings. This decreases the mobility of the molecule by increasing rigidity. This air blown pitch can then be combined with a polymer additive to achieve the desired softening point of the pellets.

Additional Embodiments

Embodiment 1. A method of producing solid pellets from a HDC pitch produced from a HDC process, the method comprising: providing a stream of HDC pitch; providing a stream of polymer additive; mixing the stream of HDC pitch with the stream of polymer additive to produce a mixture of HDC pitch and polymer additive; and pelletizing the mixture of HDC pitch and polymer additive to produce pellets having a softening point of at least 65° C. (150° F.).

Embodiment 2. The method according to Embodiment 1, wherein the HDC pitch is slurry HDC pitch, wherein the HDC process is a slurry hydroconversion process.

Embodiment 3. The method according to any one of the preceding Embodiments, wherein the mixture of HDC pitch and polymer additive contains less than 10 wt % of polymer additive.

Embodiment 4. The method according to Embodiment 3, wherein the mixture of HDC pitch and polymer additive contains less than 5 wt % of polymer additive.

Embodiment 5. The method according to Embodiment 4, wherein the mixture of HDC pitch and polymer additive contains less than 1 wt % of polymer additive.

Embodiment 6. The method according to any one of the preceding Embodiments, wherein the stream of polymer additive is a molten stream of polymer additive.

Embodiment 7. The method according to any one of the preceding Embodiments, wherein the polymer additive is one of polyethylenes, polypropylenes and polycarbonates and mixtures thereof.

Embodiment 8. The method according to Embodiment 7, wherein the polymer additive is a low density polyethylene (LDPE).

Embodiment 9. The method according to Embodiment 7, wherein the polymer additive is a high density polyethylene (HDPE).

Embodiment 10. The method according to any one of the preceding Embodiments, further comprising: providing a stream of air; and passing the stream of HDC pitch through the stream of air prior to mixing with the stream of the polymer additive.

Embodiment 11. The method according to any one of the preceding Embodiments, wherein the pellets having a softening point of at least 93° C. (200° F.).

Embodiment 12. A system for producing solid pellets from a HDC pitch produced from a HDC process, the system comprising: a source of HDC pitch; a source of polymer additive; a mixing assembly for mixing the HDC pitch with the polymer additive to produce a mixture of HDC pitch and polymer additive; and pelletizing assembly for processing the mixture of HDC pitch and polymer additive to produce pellets having a softening point of at least 65° C. (150° F.).

Embodiment 13. The system according to Embodiment 12, wherein the HDC pitch is slurry HDC pitch, wherein the HDC process is a slurry hydroconversion process.

Embodiment 14. The system according to Embodiments 12 or 13, wherein the mixture of HDC pitch and polymer additive contains less than 10 wt % of polymer additive.

Embodiment 15. The system according to Embodiment 14, wherein the mixture of HDC pitch and polymer additive contains less than 5 wt % of polymer additive.

Embodiment 16. The system according to Embodiment 15, wherein the mixture of HDC pitch and polymer additive contains less than 1 wt % of polymer additive.

Embodiment 17. The system according to any one of Embodiments 12-16, wherein the stream of polymer additive is a molten stream of polymer additive.

Embodiment 18. The system according to any one of Embodiments 12-17, wherein the polymer additive is one of polyethylenes, polypropylenes and polycarbonates and mixtures thereof.

Embodiment 19. The system according to Embodiment 18, wherein the polymer additive is a low density polyethylene (LDPE).

Embodiment 20. The system according to Embodiment 18, wherein the polymer additive is a high density polyethylene (HDPE).

Embodiment 21. The system according to any one of Embodiments 12-20, further comprising: a source of air, wherein the HDC pitch is passed through the source of air prior to mixing with the polymer additive.

Embodiment 22. The system according to any one of Embodiments 12-21, wherein the pellets having a softening point of at least 93° C. (200° F.).

Embodiment 23. A solid HDC pitch pellet comprising: a mixture of a HDC pitch and a polymer additive, wherein the polymer additive is less than 10 wt % of the total mixture, wherein the pellet having a softening point of at least 65° C. (150° F.)

Embodiment 24. The pellet according to Embodiment 23, wherein the HDC pitch is slurry HDC pitch.

Embodiment 25. The pellet according to any one of Embodiments 23-24, wherein the mixture of HDC pitch and polymer additive contains less than 5 wt % of polymer additive.

Embodiment 26. The pellet according to Embodiment 25, wherein the mixture of HDC pitch and polymer additive contains less than 1 wt % of polymer additive.

Embodiment 27. The pellet according to any one of Embodiments 2326, wherein the polymer additive is one of polyethylenes, polypropylenes and polycarbonates and mixtures thereof.

Embodiment 28. The pellet according to Embodiment 27, wherein the polymer additive is a low density polyethylene (LDPE).

Embodiment 29. The pellet according to Embodiment 27, wherein the polymer additive is a high density polyethylene (HDPE).

Embodiment 30. The pellet according to any one of Embodiments 23-29, wherein the pellets having a softening point of at least 93° C. (200° F.).

What is claimed is:

1. A method of producing solid pellets from a hydroconversion pitch produced from a hydroconversion process, the method comprising:
   providing a stream of hydroconversion pitch;
   providing a stream of polymer additive, the polymer additive comprising a polymer having a molecular weight greater than 100,000;
   mixing the stream of hydroconversion pitch with the stream of polymer additive to produce a mixture of hydroconversion pitch and polymer additive; and
   pelletizing the mixture of hydroconversion pitch and polymer additive to produce pellets having a softening point of at least 65° C. (150° F.).

2. The method according to claim 1, wherein the hydroconversion pitch is slurry hydroconversion pitch, wherein the hydroconversion process is a slurry hydroconversion process.

3. The method according to claim 1, wherein the mixture of hydroconversion pitch and polymer additive contains less than 10 wt % of polymer additive.

4. The method according to claim 1, wherein the stream of polymer additive is a molten stream of polymer additive.

5. The method according to claim 1, wherein the polymer additive is one of polyethylenes, polypropylenes and polycarbonates and mixtures thereof.

6. The method according to claim 5, wherein the polymer additive is a low density polyethylene (LDPE), a high density polyethylene (HINT), or a combination thereof.

7. The method according to claim 1, further comprising:
   providing a stream of air; and
   passing the stream of hydroconversion pitch through the stream of air prior to mixing with the stream of the polymer additive.

8. The method according to claim 1, wherein the pellets having a softening point of at least 93° C. (200° F.).

9. A system for producing solid pellets from a hydroconversion pitch produced from a hydroconversion process, the system comprising:
   a source of hydroconversion pitch;
   a source of polymer additive, the polymer additive comprising a polymer having a molecular weight greater than 100,000;
   a mixing assembly for mixing the hydroconversion pitch with the polymer additive to produce a mixture of hydroconversion pitch and polymer additive; and
   pelletizing assembly for processing the mixture of hydroconversion pitch and polymer additive to produce pellets having a softening point of at least 65° C. (150° F.).

10. The system according to claim 9, wherein the hydroconversion pitch is slurry hydroconversion pitch, wherein the hydroconversion process is a shiny hydroconversion process.

11. The system according to claim 9, wherein the stream of polymer additive is a molten stream of polymer additive.

12. The system according to claim 9, wherein the polymer additive is one of polyethylenes, polypropylenes and polycarbonates and mixtures thereof, or wherein the polymer additive is a low density polyethylene (LDPE), high density polyethylene (HDPE), or a combination thereof.

13. The system according to claim 9, further comprising:
   a source of air, wherein the hydroconversion pitch is passed through the source of air prior to mixing with the polymer additive.

14. A solid hydroconversion pitch pellet comprising:
   a mixture of a hydroconversion pitch and a polymer additive, the polymer additive comprising a polymer having a molecular weight greater than 100,000, wherein the polymer additive is less than 10 wt % of the total mixture, the pellet having a softening point of at least 65° C. (150° F.).

15. The pellet according to claim 14, wherein the hydroconversion pitch is slurry hydroconversion pitch.

16. The pellet according to claim 14, wherein the mixture of hydroconversion pitch and polymer additive contains less than 5 wt % of polymer additive.

17. The pellet according to claim 14, wherein the mixture of hydroconversion pitch and polymer additive contains less than 1 wt% of polymer additive.

18. The pellet according to claim 14, wherein the polymer additive is one of polyethylenes, polypropylenes and polycarbonates and mixtures thereof.

19. The pellet according to claim 18, wherein the polymer additive is a low density polyethylene (LDPE), a high density polyethylene (HDPE), or a combination thereof.

20. The pellet according to claim 14, wherein the pellet has a softening point of at least 93° C. (200° F.).

* * * * *